March 25, 1941. E. P. FRIESENHAHN 2,235,922
PLANTING MECHANISM
Filed April 19, 1940 3 Sheets-Sheet 2
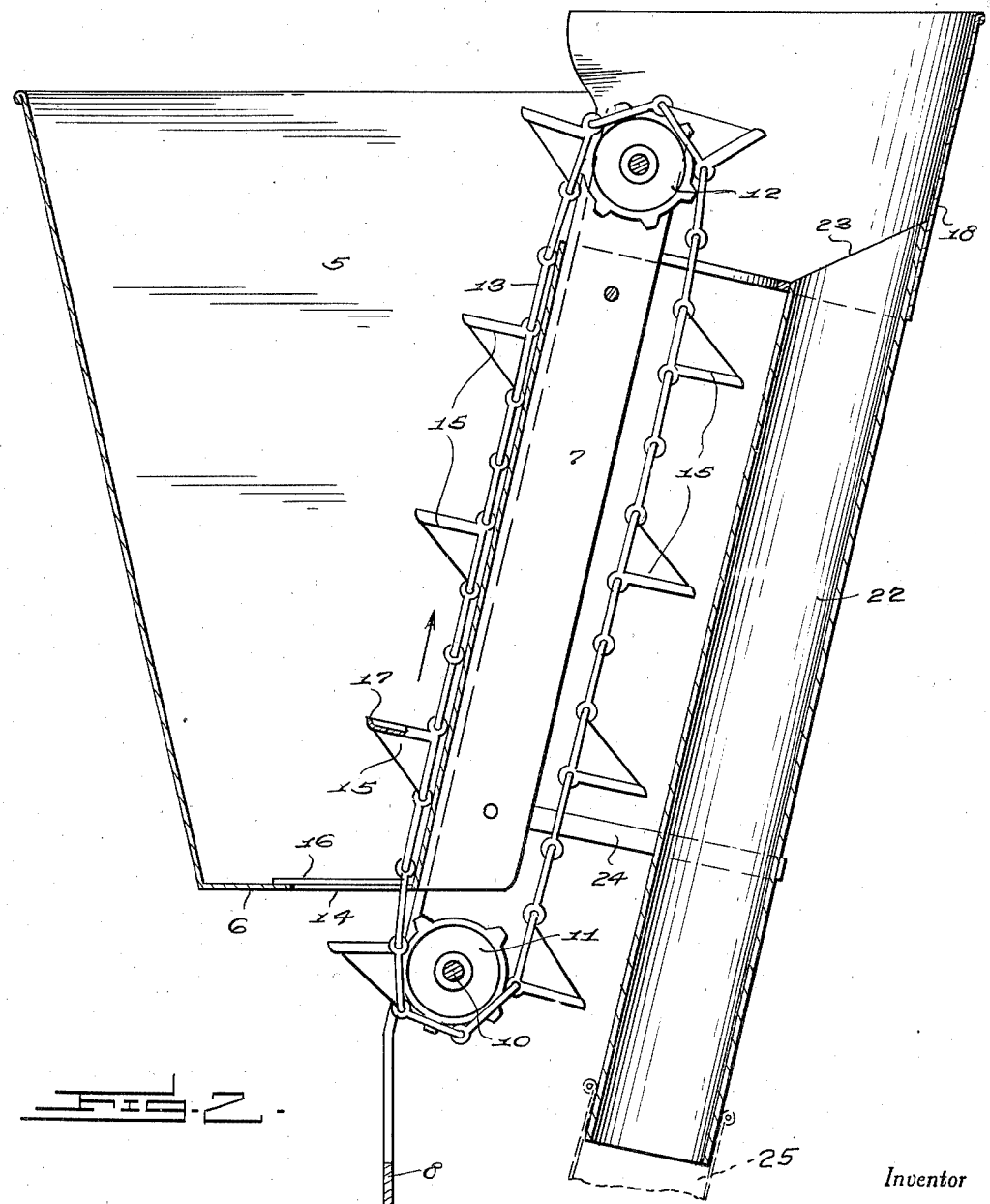
Inventor
EDWIN P. FRIESENHAHN,
By *Clarence A. O'Brien*
Attorneys March 25, 1941.  E. P. FRIESENHAHN  2,235,922
PLANTING MECHANISM
Filed April 19, 1940  3 Sheets-Sheet 3
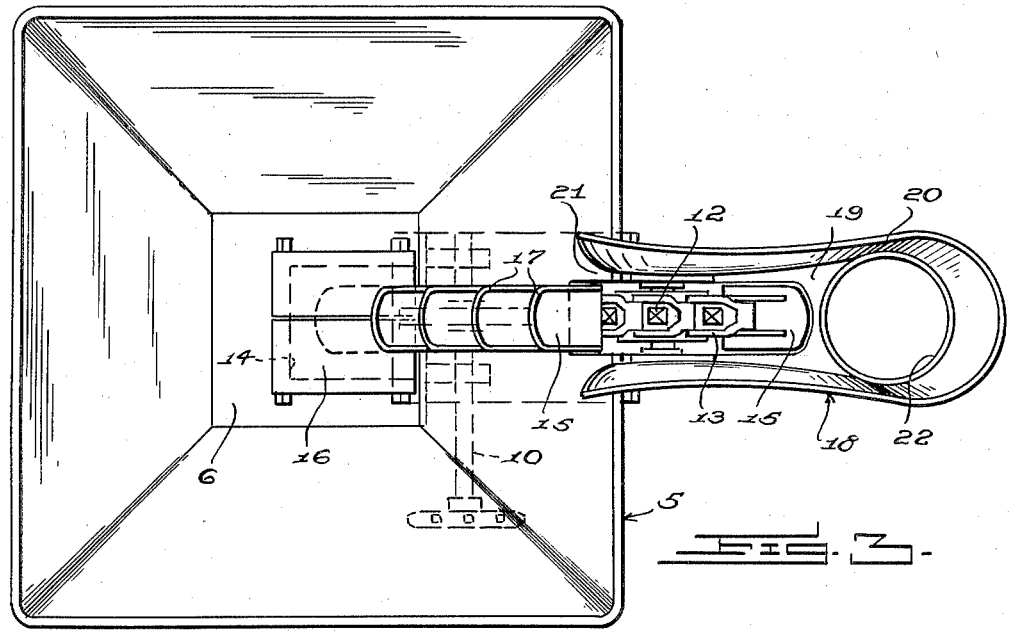
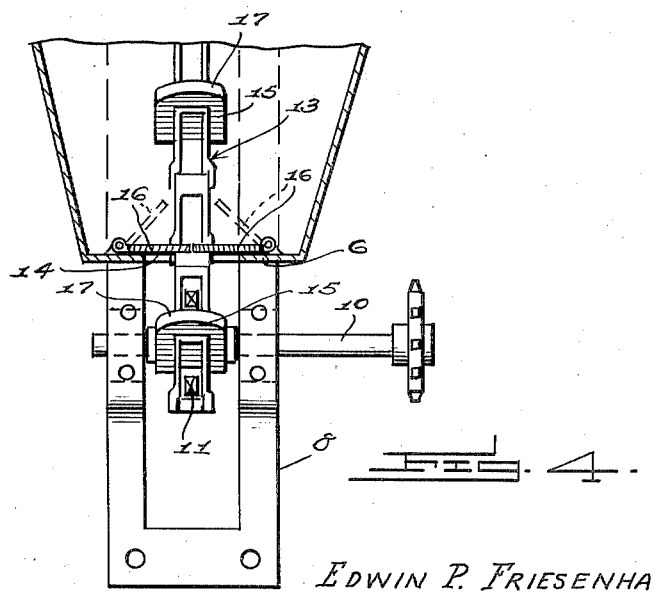
Inventor
EDWIN P. FRIESENHAHN
By *Clarence A. O'Brien*
Attorney Patented Mar. 25, 1941

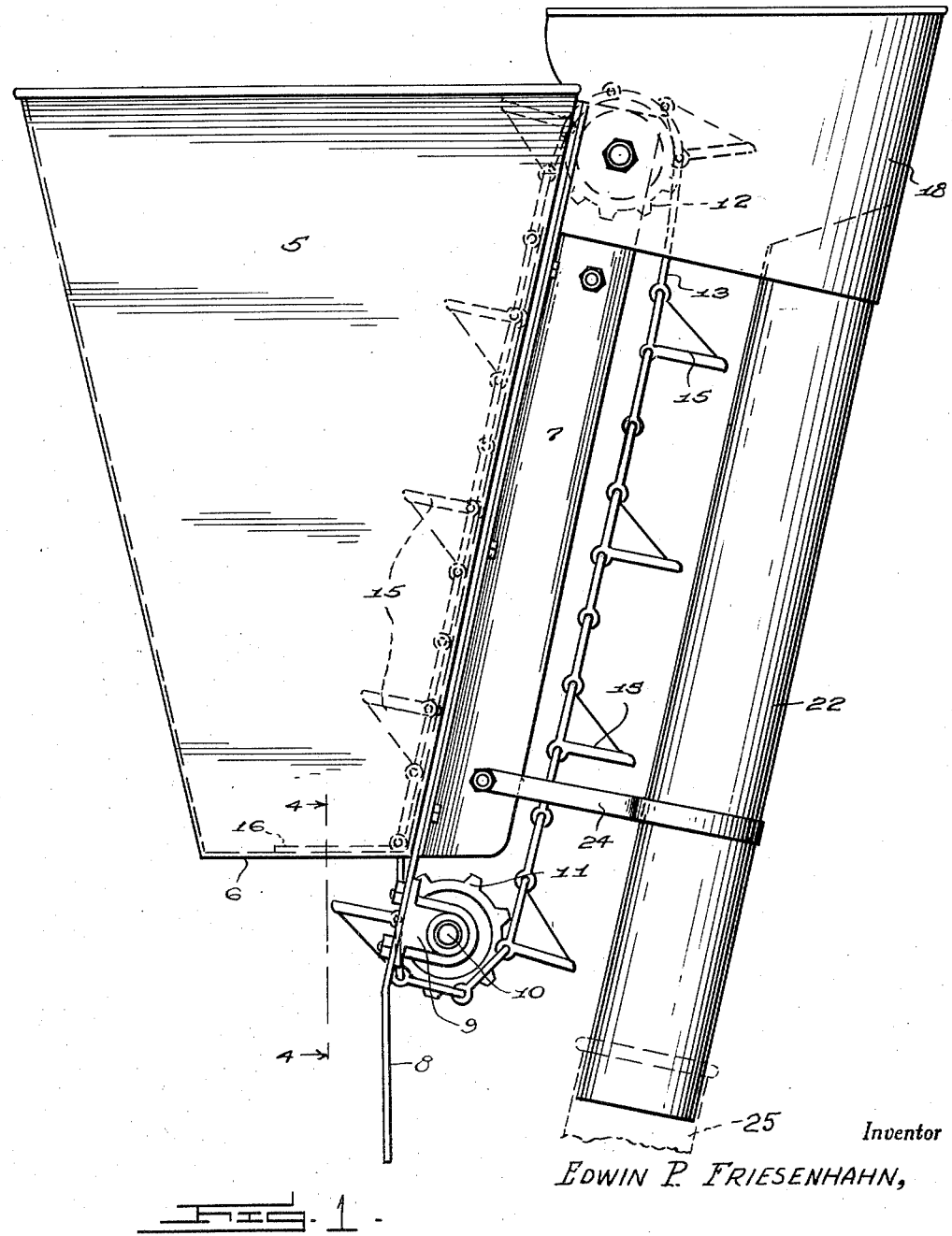

2,235,922

UNITED STATES PATENT OFFICE 2,235,922

PLANTING MECHANISM

Edwin P. Friesenhahn, San Antonio, Tex., assignor of one-half to G. O. Eastman, San Antonio, Tex.

Application April 19, 1940, Serial No. 330,607

2 Claims. (Cl. 221—128)

This invention relates to a planting mechanism for planters of a conventional construction and is especially adapted for planting seed potatoes, and has for the primary object the provision of an efficient and inexpensive device of this character which may be easily and quickly installed on a planter and which will accommodate a large number of seed potatoes and will automatically feed the seed potatoes one at a time to a discharge chute for deposit in the ground prepared therefor by the planter and at a selected distance apart.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a planting mechanism constructed in accordance with my invention.

Figure 2 is a vertical sectional view illustrating the mechanism.

Figure 3 is a top plan view illustrating the device.

Figure 4 is a detail sectional view taken on the line 4—4 of Figure 1.

Referring in detail to the drawings, the numeral 5 indicates a hopper open at its upper end to receive and accommodate a large number of seed potatoes. The hopper includes a bottom wall 6 and integral upstanding walls which diverge from the bottom wall. Formed integrally with one of the upstanding walls and arranged exteriorly of the hopper is a supporting flange 7. Also secured on said upstanding wall and straddling the supporting flange 7 is an attaching frame or bracket 8. The frame or bracket 8 extends a selected distance below the bottom wall of the hopper and is employed for the mounting of this device on a planter. The frame or bracket below the bottom wall of the hopper carries a bearing 9 which rotatably supports a shaft 10 and secured on the latter is a conveyor sprocket gear 11. The shaft 10 may be driven from the planter in any well known manner.

A conveyor sprocket gear 12 is rotatably supported by the upper end of the flange 7 slightly below the upper edges of the hopper and laterally of the latter. An endless conveyor 13 is supported by the sprocket gears 11 and 12 and one run thereof passes upwardly through an opening 14 in the bottom wall 6 of the hopper and leaves the latter adjacent its upper end by way of a slot formed in the upper portion of the hopper. The endless conveyor includes a plurality of relatively spaced flights 15 each of a size and construction to accommodate thereon a seed potato as it travels upwardly in the hopper. Flexible gates 16 are provided on the bottom wall 6 of the hopper over the opening 14 for the purpose of preventing seed potatoes from falling out of the hopper and which will permit the flights to enter the hopper by way of the opening 14. Each flight has formed thereon a marginal flange 17 to prevent a seed potato from rolling off of the flight during its upward movement through the hopper.

A catch basin 18 is carried by the upper portion of the hopper and includes a sloping bottom wall 19 and upstanding walls 20. The catch basin is of elongated formation extending laterally from one side of the hopper with the conveyor dumping therein. Portions of the upstanding walls 20 are flared to form a mouth 21 to the catch basin so that the flights may readily pass therein. The bottom wall 19 has an opening which will permit the flights and one run of the conveyor to pass therethrough as the flights descend. The flights of the conveyor after traveling upwardly and as they start to descend, discharge the seed potatoes carried thereby into the catch basin and extending into the latter is a discharge tube 22. The discharge tube 22 terminates at a selected distance below the bottom wall of the hopper and is adapted to discharge the potatoes into a flexible pipe 25 attached thereto. The flexible pipe 25 is of a length to reach the ground prepared by the planter so that the seed potatoes will be directed into said prepared ground. The upper end of the discharge tube is cut on a bias, as shown at 23, so that the seed potatoes as discharged from the flights of the conveyor into the catch basin will readily enter the tube and gravitate therethrough into the prepared ground. A bracket 24 is secured on the flange 7 and embraces the discharge tube 22 for the support thereof.

From the foregoing description, when taken in connection with the accompanying drawings, it will be seen that a very efficient, simple and durable planting mechanism has been provided which may be readily installed on a planter and which will accommodate a large supply of seed potatoes and will, through its conveyor mechanism, elevate the seed potatoes from the hopper and discharge them into the depositing tube one at a time whence the seed potatoes may gravitate into the ground prepared by the planter by way of the flexible pipe 25. Due to the arrangement of the flights on the conveyor the seed potatoes will be discharged one at a time into the chute or discharge tube.

Further it will be seen that the potatoes being discharged one at a time by the conveyor mechanism permits of planting of the seed potatoes at a selected distance apart.

It is believed that the foregoing description when taken in connection with the drawings will fully set forth the construction and advantages of this inventiaon to those skilled in the art to which such a device relates, so that further detailed description will not be required.

Having thus described the invention, what I claim is:

1. In a device of the class described, a hopper open at its upper end and having an opening in its lower end, flexible gates for closing the opening in the lower end of the hopper to prevent the escape of seed potatoes from said hopper, a conveyor mechanism supported by said hopper with one run thereof passing upwardly through the hopper by way of the opening in the lower end thereof and said gates and including a plurality of relatively spaced flights each adapted to accommodate a single seed potato obtained from the hopper, a catch basin carried by the upper portion of the hopper and having the conveyor mechanism extending therein for the deposit of seed potatoes into said catch basin from the flights of the conveyor mechanism, a discharge tube connected with the catch basin and terminating below the hopper, a flexible pipe connected to said tube and extending to the ground, an attaching flange formed on the hopper and forming a support for one end of the conveyor mechanism and the catch basin, an attaching frame secured on the hopper and extending below the latter and forming a support for the lower end of the conveyor mechanism, a bracket embracing the discharge tube and secured to the attaching flange, said catch basin including upstanding walls having portions thereof paralleling and terminating in flared ends to form a mouth for the accommodation of the upper portion of the conveyor mechanism and to permit the flights to enter said catch basin for the discharge of seed potatoes therein.

2. In a device of the class described, a hopper open at its upper end and having an opening in its lower end, flexible gates for closing the opening in the lower end of the hopper to prevent the escape of seed potatoes from said hopper, a conveyor mechanism supported by said hopper with one run thereof passing upwardly through the hopper by way of the opening in the lower end thereof and said gates and including a plurality of relatively spaced flights each adapted to accommodate a single seed potato obtained from the hopper, a catch basin carried by the upper portion of the hopper and having the conveyor mechanism extending therein for the deposit of seed potatoes into said catch basin from the flights of the conveyor mechanism, a discharge tube connected with the catch basin and terminating below the hopper, a flexible pipe connected to the tube, an attaching flange formed on the hopper and forming a support for one end of the conveyor mechanism and the catch basin, an attaching frame secured on the hopper and extending below the latter and forming a support for the lower end of the conveyor mechanism, a bracket embracing the discharge tube and secured to the attaching flange, said catch basin including upstanding walls having portions thereof paralleling and terminating in flared ends to form a mouth for the accommodation of the upper portion of the conveyor mechanism and to permit the flights to enter said catch basin for the discharge of seed potatoes therein, said discharge tube entering the catch basin and having its upper end cut on a bias to permit the seed potatoes to pass freely into said tube from the catch basin.

EDWIN P. FRIESENHAHN.